United States Patent [19]
Palazzolo

[11] Patent Number: 4,610,398
[45] Date of Patent: Sep. 9, 1986

[54] CHEESE SHREDDING MACHINE AND BLADE THEREFOR

[76] Inventor: Peter G. Palazzolo, 3518 Brotherton Rd., Cincinnati, Ohio 45209

[21] Appl. No.: 695,202

[22] Filed: Jan. 25, 1985

[51] Int. Cl.⁴ ............................................. B02C 18/04
[52] U.S. Cl. .................................. 241/92; 241/278 R; 241/280
[58] Field of Search ................ 241/92, 169.1, 278 R, 241/101.2, 280, 282; 99/538, 542, 544

[56] References Cited

U.S. PATENT DOCUMENTS

| 183,132 | 10/1876 | Clinton et al. |
| 375,806 | 1/1888 | Doering. |
| 387,861 | 8/1888 | Clawson. |
| 508,528 | 11/1893 | Poulson ............................ 241/282 |
| 519,224 | 5/1894 | Barlow. |
| 795,746 | 7/1905 | Wingfield et al. ............ 241/169.1 X |
| 1,533,217 | 4/1925 | Steiner ............................ 241/280 X |
| 1,768,094 | 6/1930 | Andrusis. |
| 1,964,290 | 6/1934 | Krause. |
| 1,988,482 | 1/1935 | Clawson, Jr. |
| 2,044,563 | 6/1936 | Carter. |
| 2,138,716 | 11/1938 | Truitt ............................... 241/278 R |
| 2,695,643 | 11/1954 | Aberer. |
| 2,726,046 | 12/1955 | Borner. |
| 4,002,298 | 1/1977 | Latora. |
| 4,082,230 | 4/1978 | Bounds. |

FOREIGN PATENT DOCUMENTS

| 381383 | 4/1936 | Fed. Rep. of Germany ........ 241/92 |
| 605462 | 5/1926 | France ................................. 241/92 |
| 619412 | 1/1927 | France ................................. 241/92 |
| 652892 | 3/1929 | France ................................. 241/92 |
| 60642 | 12/1922 | Switzerland ........................ 241/92 |
| 17873 | of 1896 | United Kingdom ................ 241/92 |

Primary Examiner—Mark Rosenbaum
Assistant Examiner—Joseph M. Gorski
Attorney, Agent, or Firm—Wood, Herron & Evans

[57] ABSTRACT

A cheese shredding machine and blade therefor are provided in which a central cutting tool and surrounding cutting teeth cooperate to provide a circular cutting surface without a central dead zone thereby permitting cheese to be presented to the full face of the blade for shredding.

7 Claims, 4 Drawing Figures

CHEESE SHREDDING MACHINE AND BLADE THEREFOR

BACKGROUND OF THE INVENTION

I. Field of the Invention

This invention relates to apparatus for comminuting foodstuffs. Specifically, the present invention relates to a machine for shredding or grating a block of cheese or the like and to a blade useful therefor.

II. Description of the Prior Art

Typical machines for shredding or grating cheese employ a circular metal blade with a plurality of apertured cutting teeth formed integrally therein. Although specific reference will be had herein to shredding it is to be understood that whether the foodstuff is shredded or grated is dependent on the specific cutting teeth formed in the blade. The problems encountered by the prior art, and the principles of the invention are interchangeable with respect to shredding or grating. Accordingly, it is to be understood that whether shredding or grating is referred to herein, either or both may be used.

The blade is either mounted about its periphery to a hub which is mounted to a motor shaft or the blade may be mounted in the center directly to the motor shaft or an extension thereof. As the blade rotates under the influence of the motor shaft, the cutting teeth cooperate to provide a circular cutting area having its axis of rotation coincident with the blade's axis of rotation.

A commonly encountered problem is that the central area of the blade (concentric with the axis of rotation) provides little, if any, comminuting or shredding action. Hence, the central region becomes a "dead zone" which can impede the progress of the shredding action. As a consequence, the central dead zone has typically been avoided.

The standard approach to avoiding the central dead zone is to present the face of the block of cheese to less than the full cutting area at any one time. Typically, the block of cheese was thus presented to the blade to one side of the central dead zone resulting in an active cutting area of approximately 50% or less of the available cutting area of the blade. Hence, only a portion of the blade is shredding the cheese at any one time resulting in lengthy periods of operation to shred a predetermined amount of cheese, say a five pound block.

An additional problem encountered by avoiding the dead zone is that the blade may be too easily stalled or stopped during cutting. It is a known principal that to stop or slow a spinning disc requires application of less pressure against the circumference of the disc then at the center thereof. By avoiding the dead zone, more of the cheese is presented nearer the circumference of the blade. As a result, care has to be exercised to not force the block of cheese against the blade with too much pressure. Hence, shredding or grating pressure must be relatively light necessitating longer cutting operation and resulting in wasted labor. Also, even slight pressure would tend to slow or stall the blade thereby slowing the cutting operation as well as causing the electric motor driving the blade to fail prematurely.

An even further problem is that while the blade face may be large enough to permit the full face of a typical five pound block of cheese to be presented to it, the active cutting area is smaller than the available cutting area of the blade. Hence, the active cutting area typically is not sufficiently large to handle the face of an uncut five pound block of cheese. Accordingly, to shred the cheese without encountering a dead zone may require that the block of cheese be sliced into smaller chunks thereby resulting in further labor costs and handling of the food. Otherwise, where the full cutting surface of the blade is presented with cheese, the dead zone acts to retard progress of the cheese into the blade resulting in an unnecessarily long shredding operation.

A further consequence of presenting cheese to the dead zone is that greater pressure is needed to force the block of cheese into the blade than where no dead zone is encountered. As shown in U.S. Pat. No. 4,002,298 to Latora, machines for comminuting a block of cheese typically move the cheese horizontally against a vertically mounted blade. The shredded (or grated) cheese then falls due to gravity from behind the blade and out of the machine. Thus, no movement of the block of cheese towards the blade occurs without some externally applied force. Were the blade to be mounted horizontally and the cheese thus lowered vertically against the blade, gravity would provide some of the force necessary to push the cheese into the blade. Many rotatable shredders and graters in which the blade is manually rotated, operate in that manner. Some automatic comminuting devices are similarly constructed. However, for commercial purposes, where large amounts of cheese must be handled in a short period of time, the benefits of using a horizontally mounted blade are minimized due to rapid build up or agglomeration of shredded cheese below the blade. As the cheese builds up, the area below the blade, and the blade itself, may become clogged thereby retarding the shredding action. Also, the machine may have to be stopped periodically to remove the built-up clumps of cheese thereby slowing down the operation and resulting in further handling of the cheese.

SUMMARY OF THE INVENTION

The machine and blade for comminuting cheese or other similar things, provided by the present invention is believed to overcome the above drawbacks. Specifically, with the machine and blade for shredding cheese of the present invention the full face of an uncut five pound block of cheese, for example, can be presented to the full cutting area of the blade without encountering a dead zone.

In another of its features, the present invention provides a cheese shredding blade which has no central dead zone. The present invention also provides a cheese shredding machine wherein the effect, in part, of gravity is advantageously employed to assist in forcing the cheese into the blade while at the same time minimizing unwanted cheese agglomeration behind the blade.

Thus, in accordance with the present invention, a machine for shredding a block of cheese is provided in which the cutting action is accomplished by cooperation of a central cutting tool and outer cutting teeth some of which are in near proximity to, and all of which surround, the central cutting tool. The cutting tool and cutting teeth cooperate to define a circular cutting surface without a central dead zone where comminuting is not being effected when the tool and teeth are rotated. Hence, cheese may be presented to the full face of the blade for shredding without encountering a disadvantageous central dead zone.

In the preferred embodiment, the machine includes a rotatable hub and a blade mounted thereto. The central cutting tool is mounted in the center of the rotating hub and projects through an aperture in the blade. The outer cutting teeth are formed in the blade. The hub could be the shaft of a motor. In an alternative embodiment, the central cutting tool is mounted directly to the blade.

The blade and hub of the preferred machine are horizontally disposed and impeller walls are provided on the hub below the blade to throw comminuted cheese clear of the path of rotation thereof. The blade and hub are also surrounded by a housing which preferably includes a chute disposed below a portion of the hub and blade to provide an egress for the comminuted cheese thrown clear of the path of rotation of the hub. The housing also preferably includes an adjustable opening above the blade to accommodate variously sized blocks of cheese and a cheese rammer to assist in pushing the block of cheese against the blade cutting surface.

As mentioned, the preferred embodiment of the blade of the present invention includes cutting teeth in near proximity to an aperture through which is received the central cutting tool. An alternative embodiment includes the central cutting tool mounted directly to the blade. In either event, the central cutting tool is preferably multi-faceted and may be either a multi-edged knife or a drill bit.

The foregoing preferred blade and preferred machine including the blade provide a machine which is believed to overcome the drawbacks of prior cheese shredders (and graters) while advantageously employing the full cutting surface for a blade and the effect of gravity. Hence, it has been found that the time necessary to shred a five pound block of cheese has been drastically reduced from several minutes to several seconds. Accordingly, the present invention may result in substantial labor cost savings. Similarly, it has been found that handling of the cheese is minimized by the present invention.

BRIEF DESCRIPTION OF THE DRAWINGS

These and other features and advantages of the invention will become more readily apparent from the following detailed description taken with the accompanying drawings in which.

DETAILED DESCRIPTION OF THE DRAWINGS

Figure 1:
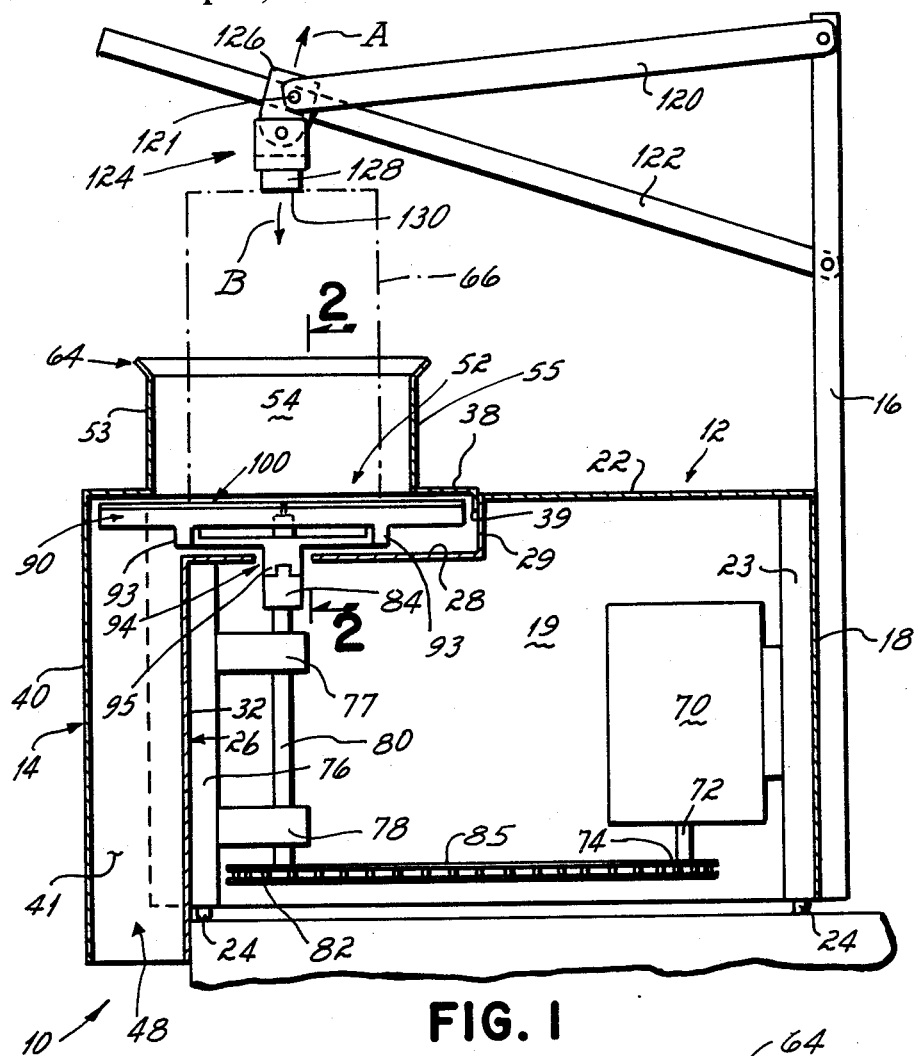
FIG. 1 is a cross-sectional view of a preferred embodiment of the cheese shredding machine of the present invention.

With reference to FIG. 1, there is shown in cross-section the cheese shredding machine 10 of the present invention. Machine 10 includes a metal housing 12, a forward removable metal mating chute cover 14 and a support member 16 affixed to the outside rear wall 18 of housing 12. Housing 12 also includes left and right walls 19, 20, respectively, and top wall 22.

Figure 4:
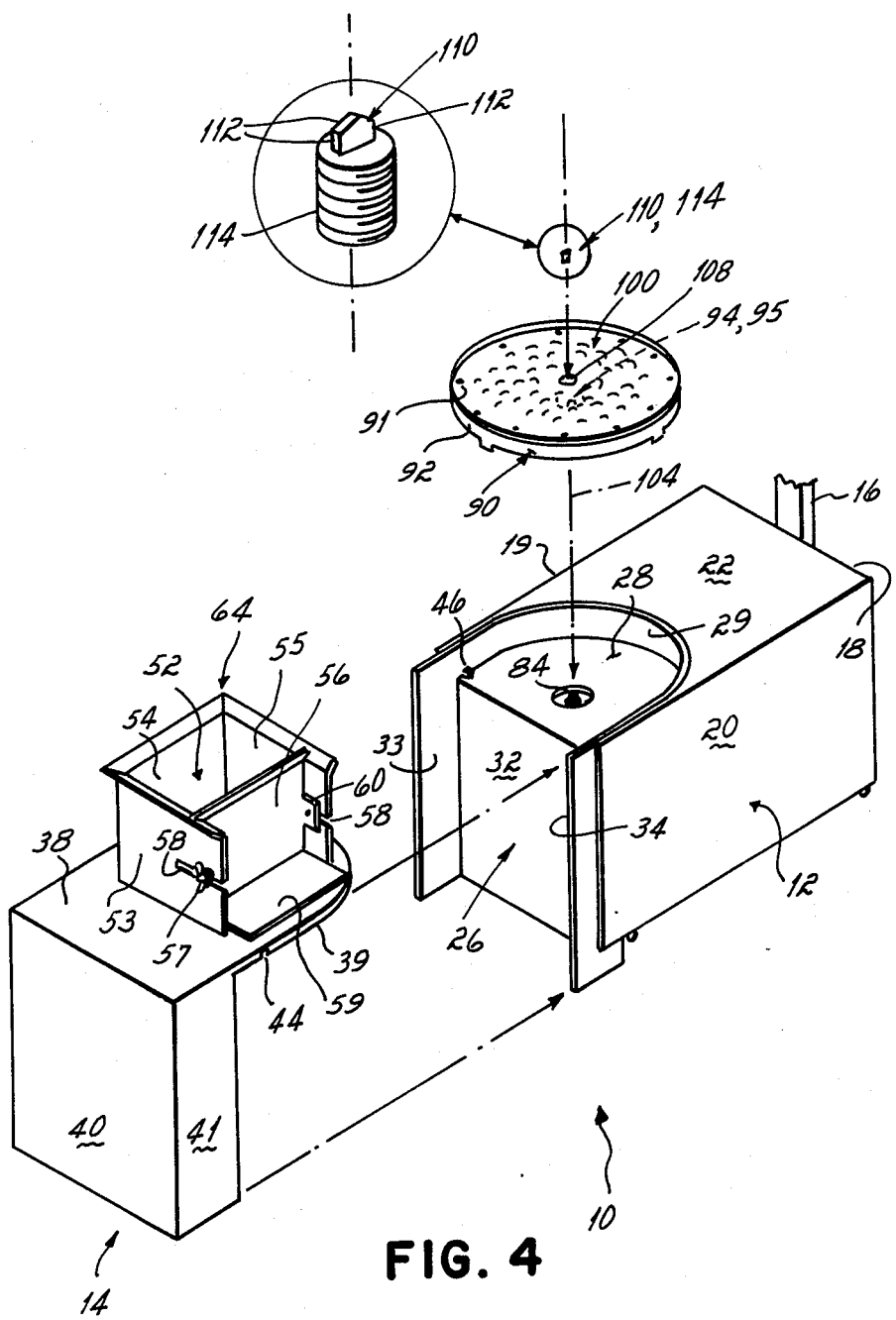
FIG. 4 is a perspective exploded view of the components of the cutting portion of the machine of FIG. 1 and showing an enlarged view of the preferred embodiment of the preferred multi-faceted cutting tool of the present invention.

With reference to FIG. 4, housing 12 has removably attached thereto a generally L-shaped backing plate 26 having an upper portion defined by U-shaped recessed floor 28 and upstruck U-shaped rear wall 29 and having a lower portion defined by wall 32 and sidewalls 33, 34. As shown in FIG. 4, when backing plate 26 is mounted to housing 12, an L-shaped depression is formed in the front end of housing 12. Backing plate 26 could alternatively be secured to housing 12 and, thus, not generally removable although the former is preferred to assist in cleaning the machine, for example. Attachment may be by any conventional means.

Chute cover 14 is L-shaped to mate with the depression formed by insertion of plate 26 into housing 12. Cover 14 has an upper U-shaped wall 38 with depending U-shaped wall 39, the latter configured to fit snugly against U-shaped wall 29. Cover 14 also has a depending lower wall portion 40 having sidewalls 41 to fit snugly against the interior of sidewalls 33, 34.

Chute cover 14, when placed onto housing 12 is secured thereto by cooperation of a pair of notches 44 (only one shown) on wall 39 and mating lugs 46, (only one shown) on wall 29. When thusly held together, wall 32 and sidewalls 33, 34 of plate 26, and wall 40 and sidewalls 41 of cover 14 form a chute 48 (FIG. 1) therebetween for purposes which will become apparent.

Upper wall 38 of chute cover 14 includes a generally rectangular opening 52 therethrough. Securely mounted to three sides of rectangular opening 52 are walls 53, 54 and 55. Walls 53 and 55 each have a slot 58 into which is received a mating finger 60 of adjustable L-shaped wall 56. Fingers 60 of L-shaped wall 56 are preferably threaded and include threaded nuts 57 thereon. When nuts 57 are loosened, L-shaped wall 56 is manually adjustable towards and away from wall 54 so as to adjust the size of generally rectangular-shaped opening 52. Wall 56 is secured in place by tightening nuts 57 as is well understood. Lower flap 59 of wall 56 cooperates to cover up the portion of opening 52 left open behind wall 56 when it is adjusted towards wall 54. Walls 53, 54, 55, and 56 thus cooperate to define a variable size hopper 64 into which a block of cheese 66 may be placed. As will be understood, the size of hopper 64 may be varied to accommodate variously sized blocks of cheese. The top of each wall 53–56 is angled outwardly to create a funnel-shape to assist in loading and handling the block of cheese 66.

Referring to FIG. 1, mounted to the inside of rear wall 18 of housing 12 is support wall 23 having feet 24 which project below housing 12. Mounted to wall 23 is motor 70 which may be selectively energized by a source (not shown) such as a standard electrical outlet and a switch (also not shown). Motor 70 is a 1 H.P. AC 1725 motor available from W. W. Grainger, Inc., and has a drive shaft 72 extending therefrom. At the end of shaft 72 is secured a ten tooth #35 sprocket 74. Mounted between left wall 19 and right wall 20 is support wall 76, which provides part of the support for backing plate 26. Wall 76 also has feet 24 which project below housing 12. Affixed to support wall 76 are two ball bearing units 77, 78. Bearing units 77, 78 are each journalled to receive a ¾" diameter drive shaft 80 therethrough. Shaft 80 is rotatable within bearing units 77, 78 as is well understood. Secured to the lowermost end of shaft 80 is a 32 tooth #35 sprocket 82. Secured to the uppermost end of shaft 80 is key 84 which will be discussed hereafter. #35 roller chain 85 is received around sprockets 74, 82 to cause shaft 80 to rotate when motor 70 is energized as is well understood.

Feet 24 are provided to set machine 10 on a flat surface such as a table or countertop. Preferably, machine 10 is set near the edge of the flat surface whereby the lower portion of chute 48 can hang over the edge of the flat surface. Hence, wall 32 of backing plate 26 and wall portion 40 of cover 14 extend below a plane defined by feet 24. Alternatively, chute 48 could terminate before that plane but the machine may then slide on the flat surface or may be placed on the surface in a manner which may tend to close off the chute thereby impeding proper operation of machine 10.

Figure 2:
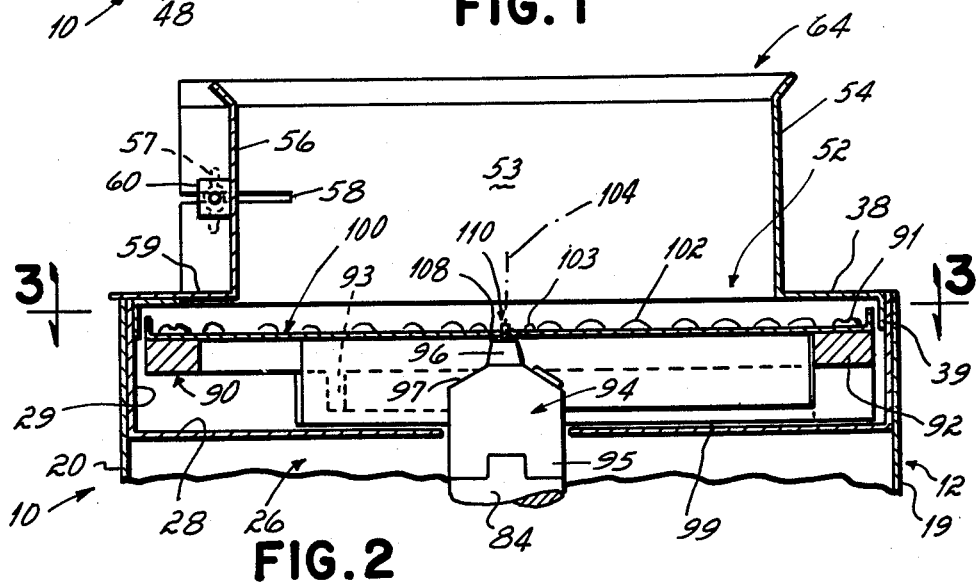
FIG. 2 is a cross-sectional view of the blade, hub, and hopper of the machine of FIG. 1 taken along line 2—2 of FIG. 1.
Figure 3:
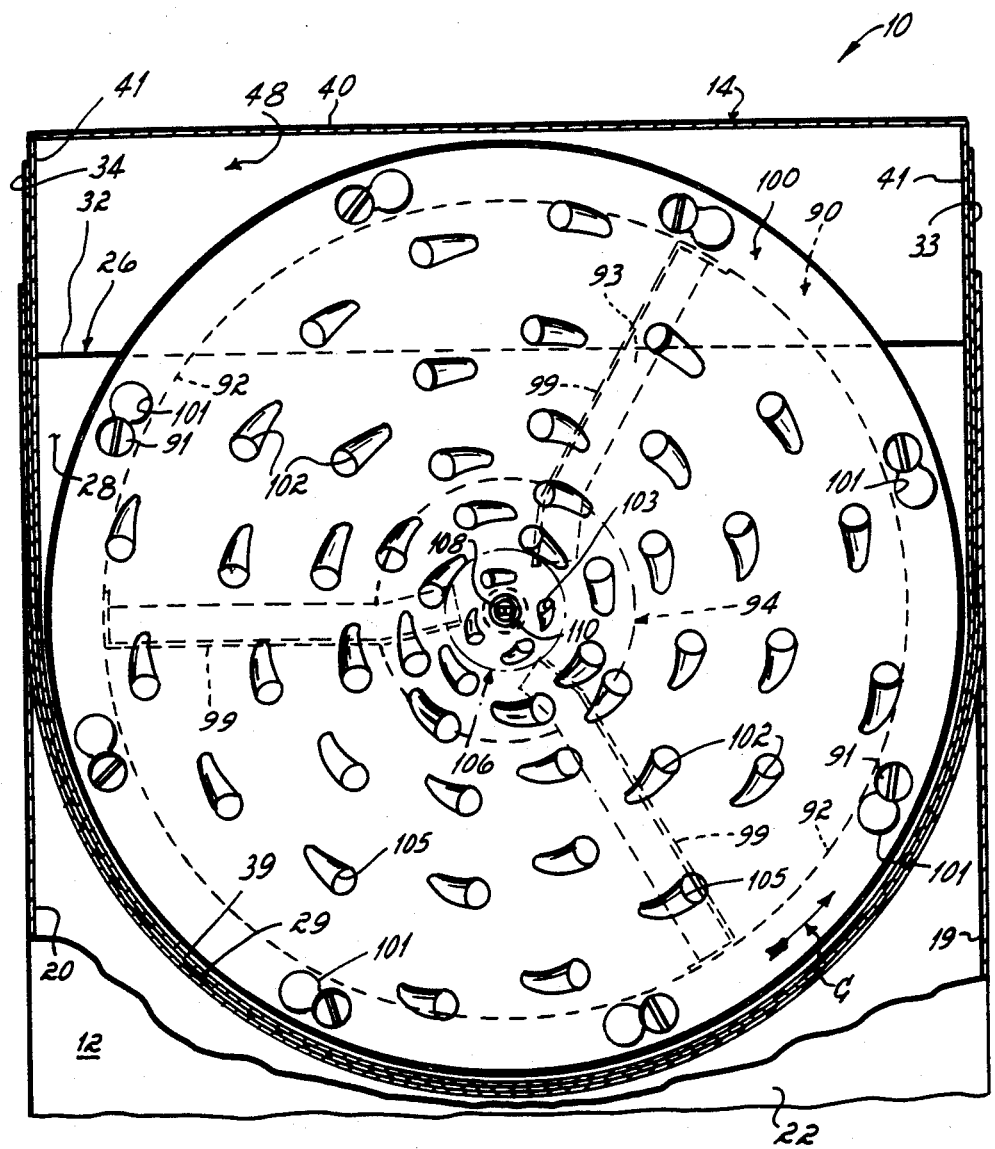
FIG. 3 is a top plan view of the blade, hub and chute of the machine of FIG. 1 taken along line 3—3 of FIG. 2.

With reference to FIGS. 2 and 3, there is shown a rotatable hub 90 to which is removably mounted and in overlying relationship therewith a circular blade 100. Blade 100 is held to circular rim 92 of hub 90 by screws 91 received through keyway slots 101 about the periphery of blade 100 and into threaded bores on rim 92. Hub 90 includes three spokes 93, 93, 93 projecting inwardly from circular rim 92. Spokes 93, 93, 93 meet at midcenter thereof and are joined together to form an axle 94 having a lower large key 95 and an upper small conically shaped support 96. Support 96 and key 95 are joined by conical shaped portion 97. As seen in FIGS. 2 and 4, key 95 of hub 90 can be placed into interfitting engagement with key 84 on shaft 80. Hence, hub 90 will rotate about an axis 104 through axle 94 when motor 20 is energized.

Formed in the face of blade 100 are a plurality of apertured, outer cutting teeth 102 which are preferably formed in a series of spirals spiralling from near the periphery of blade 100 towards and proximate the axis of rotation 104 in the center of blade 100 as is well known and understood in the art. Shown in FIG. 3 are apertured cutting teeth 102 designed to permit shredding of a block of cheese (not shown) but a variety of apertured cutting teeth may be employed for shredding, grating or other comminuting purposes as is well understood in the art. Of importance here is that outer cutting teeth 102 include the apertured cutting teeth indicated at 103 which are located proximate to axis of rotation 104 of blade 100 and are preferably within a central region 106 (approximately 1" diameter centered about axis of rotation 104). Axis of rotation 104 of blade 100 is similarly the axis of rotation 104 of hub 90. Accordingly, central region 106 overlies axle 94 and particularly support 96.

Positioned about axis of rotation 104 in blade 100 is a circular aperture 108. Received through aperture 108 is a central cutting tool 110. Cutting tool 110 is preferably multi-faceted, i.e., having a plurality of cutting edges 112. Tool 110 is integrally formed into and extends upwardly from a lower body portion 114 which is preferably threaded.

Support 96 of axle 94 is provided with a centrally located threaded bore (not shown) into which body 114 is threadably received. When joined together, tool 110 projects from axle 94 upwardly and through aperture 108 of blade 100 as in FIG. 2. Multi-faceted cutting tool 110 is shown as a knife edge but may be a drill bit or the like. Preferably, tool 110 has a multiplicity of cutting edges so that as it rotates about the axis 104 of blade 100, it can cooperate with teeth 103 to shred cheese presented within the central region 106 which would otherwise be a dead zone. Alternatively, body portion 114 could be a smooth cylinder having a flat therein (not shown) and support 94 could be provided with a smooth bore as opposed to a threaded bore and a set screw (not shown) projecting therethrough whereby the smooth cylinder may be inserted into the bore and the set screw tightened down against the flat on the cylinder to hold tool 110 in place.

An alternate form of blade (not shown) could be employed wherein cutting tool 110 is formed directly in or mounted integrally over the axis 104 of blade 100. In this latter construction, tool 110 does not include body portion 114 to be received within support 94 of hub 90 as in the preferred embodiment, but is instead part of the blade. When blade 100 is removed from hub 90, cutting tool 110 is carried away with blade 100. In the preferred embodiment, tool 110 projects through blade 100 and thus when blade 100 is removed from hub 90, cutting tool 100 remains with hub 90. The preferred embodiment is employed generally because the multi-faceted cutting tool 110 will have a longer useful life than will apertured cutting teeth 102, 103 on blade 100. Thus, if the alternative construction were employed wherein tool 110 is formed with blade 100, either blade 100 would have to be resharpened to maintain its useful life or the cutting tool 110 would be disposed of prior to the end of its useful life. Accordingly, the embodiment wherein tool 100 is received within support 94 and projects through aperture 108 in blade 100 is preferred.

Referring to FIG. 1, pivotally mounted to support member 16 are upper member 120 and lower member 122. Cheese ram 124 comprised of sliding block 126 and pusher 128, is pivotally mounted at the free end of member 120 as at 121. Sliding block 126 includes an aperture therethrough (not shown) through which member 122 is slidably received. As member 122 is raised or lowered (arrows A and B, respectively) block 126 slides rearwardly or forwardly on member 122 and pivots at 121 on member 120 so as to generally maintain its horizontal location with respect to hopper 64 so as to maintain cheese 66 in a generally vertical attitude as it is pushed into blade 100.

Existing shredders or graters generally employ short stroke driving devices able to operate on only small blocks of cheese. Additional labor and procedures are necessary to cut up larger blocks of cheese to make the smaller blocks. By virtue of members 120, 122 and ram 124, machine 10 will accept a block of cheese 66 up to 17 inches in height thus minimizing or eliminating the time and cost of making smaller blocks.

In operation, plate 26 is mounted to housing 12, the hub/blade/tool assembly 90, 100, 110 is placed into the depression formed in housing 12 by plate 26, and key 95 is set on key 84 of shaft 80. As can be seen, key 84 is located nearer wall 32 than U-shaped wall 29. Hence, when hub 90 is mounted to key 84, a portion of hub 90 (and hence blade 100) will extend beyond wall 32 and into chute area 48 (FIG. 1). Chute cover 14 is then mounted to housing 12 such that lugs 46 are received in notches 44. Wall 56 is adjusted to the appropriate size to hold the block of cheese 66 or the like which is to be shredded by blade 100. The block of cheese 66 is placed through hopper 64 and through generally rectangular shaped opening 52 until it rests on blade 100.

Cheese ram 124 is employed to assist gravity in forcing block of cheese 66 into blade 100. To that end, pivotally mounted to the bottom of sliding block 126 is pusher 128 which makes contact with block of cheese 66 and is pivotable such that pusher's 128 bottom face 130, which may be roughened so as to provide frictional engagement thereof, can be angled, if necessary to be parallel with the upper face of cheese block 66 thereby maintaining the latter in a generally upright position as rod 122 is lowered so as to cause cheese 66 to impact blade 100 head on and not at an angle and/or to prevent cheese block 66 from falling out of hopper 64.

Motor 70 is energized causing blade 100 to rotate in a counter-clockwise direction as indicated by arrow C in FIG. 3 such that the apertured teeth will contact the cheese with the cutting edge 105 first. The rotation of blade 100 results in an active circular-shaped cutting area about axis 104 which, by virtue of teeth 103 and tool 110, includes substantially the full face area of blade 100 within rim 92 of hub 90. Hence, block of cheese 66 may be presented to substantially the entire cutting area of blade 100 without encountering a dead zone. By eliminating the dead zone, and by placing hopper 64 over the center of blade 100, during a shredding operation, even great pressures applied on cheese block 66 will not materially slow rotation of blade 100. Not only is motor life prolonged but a five pound block of cheese can be shredded exceedingly rapidly, depending on the force applied by ram 124, with little adverse consequences. To that end, lower member 122 is 24 inches long permitting the user (not shown) to apply great pressure to the cheese 66 with little effort resulting in a substantially brief cutting time and less operator fatigue.

In the preferred embodiment shown, blade 100 is horizontally mounted rather than vertically mounted. Thus, as can be seen from FIG. 1, blade 100 is between hub 90 and hopper 64. In this disposition, shredded cheese will tend to collect or agglomerate on U-shaped floor 28. To obviate the problems arising therefrom, each of the spokes 93 of hub 90 is provided with upstanding wall members 99. Each wall member 99 projects from its associated spoke 93, which is spaced below the undersurface of blade 100, up to just adjacent to the undersurface of blade 100 and down to the bottom edge of the spoke adjacent floor 28, and from rim 92 to axle 94. As hub 90 rotates, wall members 99 provide impeller action to the shredded cheese as it falls from behind blade 100. The impeller action of wall members 99 and the U-shape of wall 29 cooperate to force the shredded cheese towards chute cover 14 and into the chute area 48 so that it may fall by force of gravity into a receptacle (not shown). Also, conical support 96 and conical portion 97 assist in permitting cheese under the central region 106 to fall away from axle 94. In the above manner, the advantages of a horizontally mounted blade 100 may be employed without the expected disadvantages of such a construction.

The foregoing is a preferred embodiment of a cheese shredding machine and a blade therefore. Although the primary intended use of the present invention is for shredding cheese, there are a multiplicity of other possible applications such as grating or the like. Thus, although initially conceived and designed for shredding a block of cheese, the machine of the present invention may also be utilized to comminute other food stuffs.

Having described the invention, what is claimed is:

1. A machine, for shredding a block of cheese-like material, comprising:
   rotatable hub means defining a horizontal reference and having a central axis of rotation;
   a cheese shredder blade having a substantially horizontal surface defining a plane, said blade being disposed above and mounted to said rotatable hub means for rotation therewith;
   multi-faceted central cutting means for shredding a portion of a block of cheese-like material across and through said axis of rotation, said cutting means being removably received in said rotatable hub means and projecting upwardly through an aperture in said blade and away from said rotatable hub means along the axis of rotation, said cutting means having at least a first cutting edge and a second cutting edge, said first cutting edge being spaced from said axis of rotation and extending vertically upwardly from said plane to a first terminus spaced above said plane, said second cutting edge being spaced above said plane and extending upwardly from said first terminus to a second terminus at said axis of rotation, said second terminus being spaced above said first terminus and said second terminus being spaced from said plane by a vertical distance that is greater than a vertical distance from said plane to any other point on said cutting means;
   a plurality of apertured outer cutting teeth formed in said blade and projecting upwardly from said plane, each tooth presenting a single cutting edge, at least some of said teeth being in near proximity to and surrounding said central cutting means, said teeth being formed in a series of spirals spiralling outwardly from near said central cutting means, said teeth being adapted to shred another portion of the block of cheese-like material, said central cutting means and said outer cutting teeth defining a circular shredding surface without a dead zone, which is where shredding is not being effected, when said rotatable hub means is rotated;
   hopper means disposed above said blade for presenting the block of cheese-like material to said circular shredding surface teeth and said central cutting means;
   cheese ramming means movable between a first position spaced above said hopper means and a second position spaced adjacent said shredding surface for pushing the block of cheese-like material against said shredding surface;
   said hub means and said blade having respective outer edges, at least one of said outer edges defining a periphery of said hub means and blade, the machine further including housing means surrounding said periphery of said hub means and blade; and
   motor means coupled to said hub means for rotating said hub means, blade, and central cutting means; said circular shredding surface without a dead zone cooperating to shred cheese without materially slowing rotation of said hub means, said blade, and central cutting means in order to reduce the likelihood of premature failure of said motor means.

2. The machine of claim 1, said rotatable hub means further including impeller means for throwing said shredded cheese-like material clear of the path of rotation of said rotatable hub means.

3. The machine of claim 2, said housing means underlying a portion of said hub means; and
   chute means being disposed below a remaining portion of said hub means to provide an egress for said shredded cheese-like material thrown clear of said path of rotation of said rotatable hub means.

4. The machine of claim 1, said central cutting means further including a third and a fourth cutting edge, said third cutting edge being spaced from said axis of rotation and said first cutting edge, and said third cutting edge extending vertically upwardly from said plane to a third terminus spaced above said plane, said fourth cutting edge being spaced above said plane and extending upwardly from said third terminus to said second terminus at said axis of rotation, said second terminus being spaced above said third terminus.

5. The machine of claim 1, said hopper means including a plurality of generally vertically upstanding walls to define an opening, one of said upstanding walls being selectively movable towards and away from at least one other of said upstanding walls to thereby render said opening adjustable to receive therethrough variously sized blocks of cheese-like material.

6. The machine of claim 5, said cheese ramming means including:
 a pivoting member;
 a block slidable along said pivoting member so as to generally maintain a predetermined horizontal location with respect to said adjustable opening independently of the position of said pivoting member; and
 a cheese pusher pivotally mounted to said block, said block and said cheese pusher cooperating to maintain the block of cheese-like material in substantially a vertical attitude and to push the block of cheese-like material against said cutting surface as said pivoting member moves.

7. The machine of claim 1, said cheese ramming means including:
 a pivoting member;
 a block slidable along said pivoting member so as to generally maintain a predetermined horizontal location with respect to said hopper means independently of the position of said pivoting member; and
 a cheese pusher pivotally mounted to said block, said block and said cheese pusher cooperating to maintain the block of cheese-like material in substantially a vertical attitude and to push the block of cheese-like material against said shredding surface as said pivoting member moves.

* * * * *

UNITED STATES PATENT AND TRADEMARK OFFICE
CERTIFICATE OF CORRECTION

PATENT NO. : 4,610,398

DATED : September 9, 1986

INVENTOR(S) : Peter G. Palazzolo

It is certified that error appears in the above-identified patent and that said Letters Patent is hereby corrected as shown below:

Col. 8, line 36, "teeth and said central cutting means" should be omitted.

Col. 8, line 52, "said" before the word blade should be omitted.

Signed and Sealed this

Sixth Day of January, 1987

*Attest:*

DONALD J. QUIGG

*Attesting Officer*  *Commissioner of Patents and Trademarks*